Patented Nov. 10, 1936

2,060,423

UNITED STATES PATENT OFFICE 2,060,423

TREATMENT OF FROZEN MEAT

Harry H. McKee, Chicago, and William McDonald, River Forest, Ill., assignors to Industrial Patents Corporation, Chicago, Ill., a corporation of Delaware Application February 24, 1934, Serial No. 712,710

3 Claims. (Cl. 99—107)

The invention relates to a method of treating frozen meat products for defrosting the same.

The conventional method of defrosting meats involves subjecting the meats to a high temperature until all frost is removed from the product. This process has been carried out under natural circulation or has been assisted by circulation of air by fans to hasten the defrosting. The heat has been supplied from closed steam coils or other indirect heating system.

Such operations have been conducted without control of humidity of the air and have resulted in shrinkage in weight of the meat product, variations in the condition of the product, dried out and toughened surfaces of the meat product, loss of meat juices, discoloration of the meat product and lowering in appearance and quality of the product.

One of the objects of the present invention to defrost meat products by a method and means which will produce an actual gain in weight of the meat product, an improvement in color and quality of the meat product, and a retention in the meat product of the natural meat juices so that the defrosting will result in a uniform condition throughout the meat product and at the same time be performed in less time than by the methods heretofore practiced.

Other objects of the invention will be apparent from the description and claims which follow.

Figure 1:
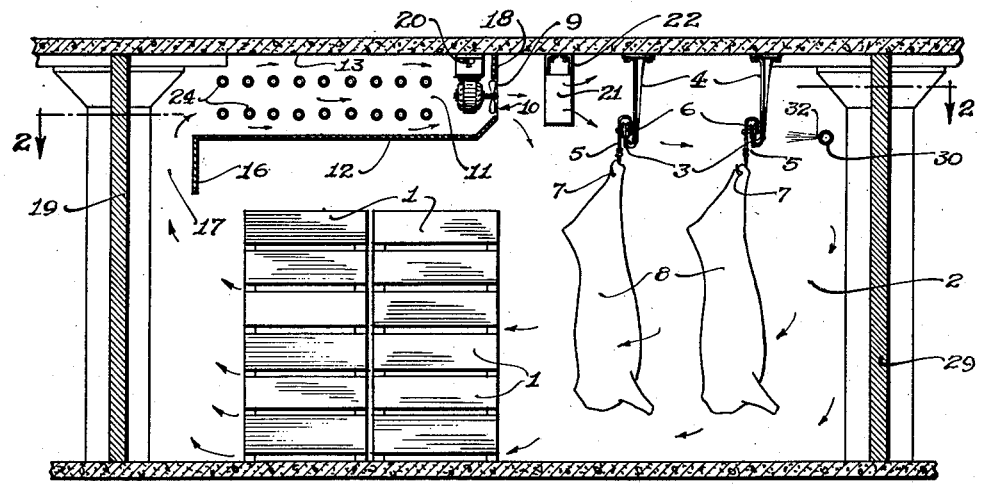
Figure 1 is a vertical sectional view through a thaw room provided with means for carrying out the method of the present invention.
Figure 2:
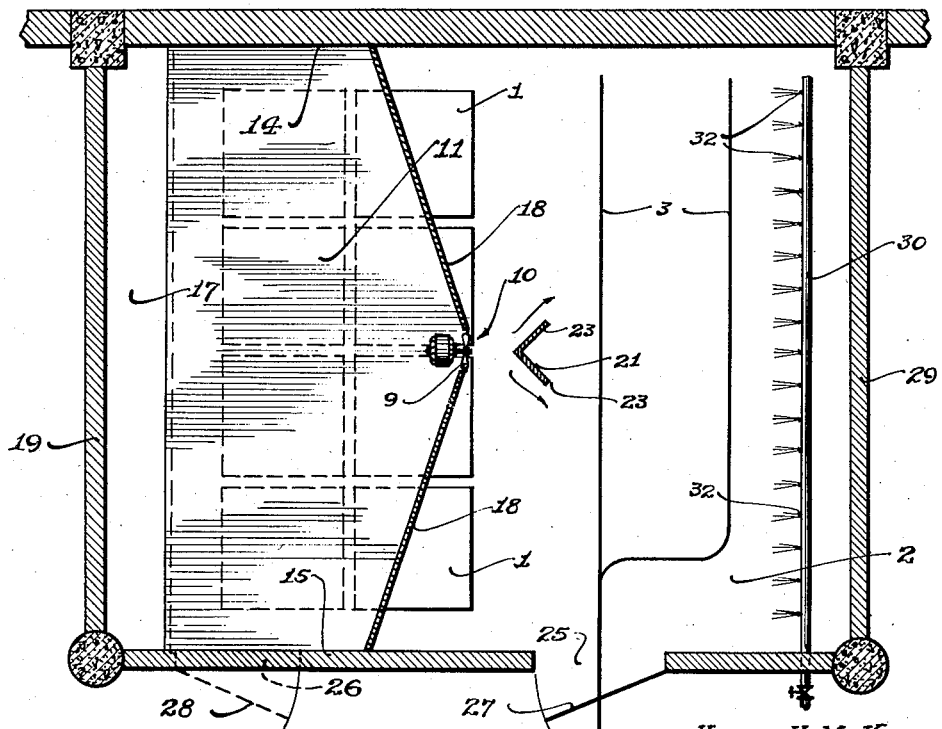
Fig. 2 is a horizontal sectional view taken substantially on the line 2—2 of Fig. 1.

In the accompanying drawing is illustrated one form of structure and apparatus for carrying out the method of the present invention and it will be understood that the present invention is not limited to the particular form of structure and apparatus shown, but that the claims define the scope of the invention.

The meat products when in the form of frozen cuts of pork or beef are placed on racks 1 within thaw room or chamber 2 which is also provided with horizontal rails 3 supported from the ceiling of the thaw room by fixed hangers 4 and adapted to receive movable meat hangers 5.

The movable meat hangers 5 which may be of any desired construction are provided with grooved rollers or wheels 6 arranged to run on the rails 3 and the said meat hangers have depending hooks 7 for enabling carcasses 8 of beef or other animals to be suspended from the meat hangers.

The movable meat hangers and the racks enable the meat products to be spread out in the thaw room to permit a thorough circulation of air through the meat products. The circulation of air in the thaw room is indicated by the arrows 5 in Figure 1 of the drawing, and the air will impinge against the meat products throughout the entire exposed surfaces of the same.

The circulation of air is produced by a fan 9 located at the central outlet 10 at the front of an overhead air duct 11 having a horizontal bottom wall 12 arranged in spaced relation with the ceiling 13 of the thaw room and extending entirely across the same between the side walls 14 and 15 and terminating in spaced relation with the end wall 19 and provided with a depending extension 16 disposed vertically in spaced relation with the end wall 19 and forming an entrance 17 to the air duct 11. The air duct is provided with an inner or front wall composed of converging sections 18 extending upwardly from the horizontal bottom wall 12 to the ceiling and spaced apart at their adjacent ends to form an air discharge outlet 10 in which the fan 9 operates. The air after passing through the meat products passes upwardly at the back of the lower chamber through the inlet 17 of the duct 11 and forwardly through the duct to the front outlet or discharge opening 10. The fan is preferably suspended from the ceiling, as clearly indicated at 20 in Figure 1 of the drawing.

In order to effect a uniform distribution of the air after passing through the outlet of the air duct an approximately V-shaped baffle 21 is employed. The baffle 21 which is suspended from the ceiling 13 by a suitable hanger 22 is composed of two angularly related sides or wings 23 which diverge from a point in front of and spaced from the outlet 10 of the air duct.

Within the air duct is located a dehumidifying apparatus 24 which may be of any suitable construction, and which is preferably provided with upper and lower rows of tubular members arranged in spaced relation as clearly illustrated in Figure 1 of the drawing.

The thaw room or chamber may, of course, be of any desired capacity and the wall 15 is designed to be provided with inlet and outlet openings 25 and 26 controlled by adjustable closures 27 and 28.

Extending across the thaw room adjacent the end wall 29 is a steam pipe 30 located at the upper portion of the thaw room and provided with small apertures 32 for the discharge of live steam into the thaw room for supplying both heat and moisture to the same. The open steam pipe 30 discharges steam directly into the thaw room and by regulating the supply of steam both the temperature and the humidity may be controlled. In dehumidifying the air after thawing of the meat products the steam is shut off and the dehumidifying apparatus is operated to lower the humidity of the circulated air to the desired degree so that the circulation of air will not remove the surface moisture from the meat products.

This will cause the surface moisture to be absorbed by the meat products in drying and will prevent the loss of meat juices and also loss of weight and at the same time will preserve the natural apearance, conditions and structure of the meat products. Also the natural bloom of the meat products will be restored and the color of the meat products improved.

In order to outline the operation more completely, an example is taken which is merely descriptive and not limiting in the conditions stated. Frozen carcasses are taken into the thaw room which may be at ordinary temperatures and humidities, and at the same time frozen cuts are placed on the racks. The effect of the low temperature frozen meat products is to lower the temperature of the thaw room and decrease the humidity. Steam is then admitted into the thaw room to produce a saturated condition of the air and the fan or fans are started to cause a circulation of air in the thaw room which may be equipped with one or more defrosting units. Control of the temperature in the thaw room is regulated by the amount of steam admitted to the same. In the process of defrosting the frozen meat products the temperature is maintained around forty degrees Fahrenheit which has been found to be a satisfactory temperature although a lower temperature may be used to advantage. This condition is maintained for approximately sixteen hours or until the meat product appears to be practically thawed out, when the steam is shut off and the humidity reduced by the dehumidifying apparatus 24 to the necessary point for causing the surface moisture on the meat product to be absorbed by the latter.

The circulation of the air is continued until the surface conditions of the meat product return to normal and the bleached appearance produced by the high humidity disappears and the meat takes on a bloom. A temperature during this period of about thirty-four degrees Fahrenheit has been found satisfactory although the temperature may be slightly varied.

The result of this treatment of frozen meat product is that the meat internally is brighter than the color produced by methods heretofore practiced, the surface retains the moist condition of fresh meat and an actual gain in weight is produced instead of a shrinkage. Also during the process there is no loss of meat juices. With pork products, etc., going to cure and to be used in processes requiring moist conditions, the drying step after the thawing of the meat will not be necessary and the meat product as soon as defrosted will be in condition for such curing processes.

What is claimed is:

1. The method of defrosting meats which consists in placing frozen meat products in a closed chamber in an atmosphere at ordinary temperature and humidity whereby the temperature will be lowered and the humidity decreased, admitting steam into the chamber sufficiently to produce a saturated condition of the air therein and to raise the temperature of the air sufficiently to thaw the meat products, circulating the air about the the meat products, permitting the meat products to remain in the circulated moisture-saturated air of raised temperature until thawed, thereafter lowering the temperature and decreasing the humidity of the air and permitting the meat products to remain in the circulated air of lowered temperature and decreased humidity until absorption by the meat products of the surface moisture thereon, whereby the meat products are defrosted without loss of weight or meat juices and the natural appearance and conditions of the meat products are preserved.

2. The method of defrosting meats which consists in placing frozen meat products in a closed chamber in an atmosphere at ordinary temperature and humidity whereby the temperature will be lowered and the humidity decreased, admitting steam into the chamber sufficiently to produce a saturated condition of the air therein and to raise the temperature of the air sufficiently to thaw the meat products, circulating the air about the meat products, permitting the meat products to remain in the circulated moisture-saturated air of raised temperature until thawed, thereafter lowering the temperature and decreasing the humidity of the air and permitting the meat products to remain in the circulated air of lowered temperature and decreased humidity until absorption by the meat products of the surface moisture thereon, whereby the meat products are defrosted without loss of weight or meat juices and the natural appearance and conditions of the meat products are preserved, the temperature of the air within the chamber being controlled and maintained within a range of between thirty-four and forty degrees Fahrenheit.

3. The method of defrosting meats which consists in placing frozen meat products in a closed chamber in an atmosphere of ordinary temperature and humidity whereby the temperature will be lowered and the humidity decreased, admitting steam into the chamber sufficiently to produce a saturated condition of the air therein and to raise the temperature of the air to approximately forty degrees Fahrenheit, circulating the air about the meat products, permitting the meat products to remain in the circulated moisture-saturated air of raised temperature until thawed, thereafter decreasing the humidity of the air and lowering the temperature to approximately thirty-four degrees Fahrenheit and permitting the meat products to remain in the circulated air of decreased humidity and lower temperature until absorption by the meat products of the surface moisture thereon, whereby the meat products are defrosted without loss of weight or meat juices and the natural appearance and conditions of the meat products are preserved.

HARRY H. McKEE.
WM. McDONALD.